/ Patented Dec. 30, 1941

2,268,126

UNITED STATES PATENT OFFICE 2,268,126

CONDENSATION PRODUCTS AND PROCESS OF PREPARING THEM

Ludwig Orthner and Heinz Sönke, Frankfort-on-the-Main, Germany, assignors to I. G. Farbenindustrie Aktiengesellschaft, Frankfort-on-the-Main, Germany No Drawing. Application July 14, 1938, Serial No. 219,193. In Germany July 28, 1937

8 Claims. (Cl. 260—457)

The present invention relates to condensation products and to a process of preparing them.

We have found that valuable condensation products are obtainable by causing to react a compound selected from the group consisting of compounds having one of the general formulae

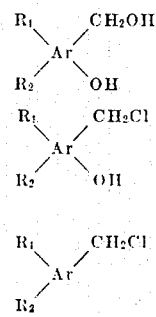

and wherein Ar stands for a member of the group consisting of aromatic hydrocarbon radicals and substituted aromatic hydrocarbon radicals, $R_1$ stands for a member of the group consisting of alkyl radicals of at least three carbon atoms, aralkyl radicals and cycloaliphatic hydrocarbon radicals, $R_2$ stands for a member of the group consisting of hydrogen, alkyl radicals of at least three carbon atoms, aralkyl radicals and cycloaliphatic hydrocarbon radicals, with an aliphatic polyhydroxyl compound and introducing into the condensation products, if desired, the residue of a polybasic inorganic acid containing oxygen.

Parent materials for this reaction are, for instance: hydroxymethyl compounds obtainable from formaldehyde and aromatic hydroxy-compounds substituted by $R_1$ and $R_2$ having the above-indicated meaning. Suitable phenols are, for instance, para-tertiary-butylphenol, iso-hexylphenol, iso-octylphenol, iso-octyl-ortho-cresol, para-n-dodecyl-phenol, para-octodecyl-phenol, dodecyl-naphthol, iso-octylresorcinol, para-benzylphenol, paracyclohexylphenol, di-iso-octyl-phenol, iso-butyl-iso-octyl-phenol, furthermore condensation products of phenols and olefines such as are obtained by dimerisation of isobutylene, isohexylene and isoheptylene or by polymerisation of propylene, or condensation products of phenols and chlorinated aliphatic hydrocarbons of high molecular weight. Besides the alkyl, aralkyl or cycloalkyl substituents, the phenols may further contain in the nucleus any desired substituent, such as chlorine, bromine or a group, such as, for instance, the $NO_2$— or $SO_3H$—group. It is also possible to use, instead of the hydroxymethyl compounds of phenols mixtures of the phenols with formaldehyde.

There may also be used, instead of the hydroxymethyl compounds, the chloromethyl compounds of the aromatic hydroxy compounds substituted by $R_1$ and $R_2$ having the above-indicated meaning. These compounds are obtained, in known manner, from the respective substituted phenols, formaldehyde and concentrated hydrochloric acid, while dry hydrochloric acid gas is passed through the mass.

There are also suitable for these reactions alkylated, cycloalkylated or aralkylated aromatic chloromethyl compounds obtainable from the corresponding aromatic hydrocarbons or the substitution products thereof and formaldehyde in the presence of concentrated hydrochloric acid. Such chloromethyl compounds are, for instance: iso-tertiary-butylbenzyl chloride, iso-hexylbenzyl chloride, iso-octylbenzyl chloride, iso-octyl-ortho-methylbenzyl chloride, para-n-dodecylbenzyl chloride, para-octodecyl-benzyl chloride, dodecyl-chloromethyl-naphthalene, para-cyclohexylbenzyl chloride, di-iso-butyl-benzylchloride, furthermore, chloromethyl compounds from the condensation products of chlorinated aliphatic hydrocarbons of high molecular weight or of olefines obtained by dimerisation of isobutylene, isohexylene, isoheptylene or by polymerisation of propylene, with aromatic hydrocarbons.

Aliphatic polyhydroxyl compounds suitable for use in the invention are, for instance, glycerol, polyglycerol, erythritol, penta-erythritol, trimethyloylpropane, hexitols, such as mannitol and sorbitol, polyhydroxyl compounds such as are formed by reduction of condensation products of formaldehyde or by reduction cleavage of carbohydrates, monosaccharides such as glucose, fructose, mannose, polysaccharides such as saccharose, maltose, cellobiose, sugar mixtures, such as are obtained by hydrolysis of cellulose or by condensation of formaldehyde, and water-soluble degredation products of cellulose and starch of dextrin-like nature.

Among the aliphatic polyhydroxyl compounds also the polyhydroxyl amines may be mentioned, for instance, triethanolamine, the products of the action of ethylene oxide on triethanolamine, diethanolamine, propanediolamine, glucamine, methylglucamine, phenylglucamine and diglucamine; further, compounds obtained by hydrogenating the condensation product of formaldehyde or water-soluble degradation products of cellulose or starch in the presence of primary or secondary amines.

The condensations involved in the invention are effected in an aqueous, aqueous-alcoholic or in an alcoholic solution. Alcohols suitable for use are methyl alcohol, ethyl alcohol, butyl alcohol. There may also be used other solvents, such as, for instance dioxane, benzene or chloroform. The condensation is accelerated by condensation catalysts of basic or acid nature. Among these catalysts may be named: alkali hydroxides, alkali alcoholates, alkali amides, alkali carbonates, piperidine, diethyl-amine, inorganic acids, such as hydrochloric acid, sulfuric acid, strong organic acids such as para-toluenesulfonic acid, chloracetic acid, lactic acid and acid salts or salts forming complex compounds, such as zinc chloride, aluminium chloride, lithium bromide. The reaction may preferably be performed at an elevated temperature varying with the kind of solvent used and with the products to be condensed.

When condensing hydroxymethyl compounds, formaldehyde is advantageously added to the reaction solution, the reaction occurring in this case more smoothly and without formation of by-products such as resins.

The reaction solutions are worked up, for instance, by diluting them with water and extracting with water-insoluble solvents. The condensation products remain, in this case, in the aqueous phase, whereas the unaltered hydroxymethyl- or chloromethyl-compounds enter the layer of the solvent from which they may be recovered in the unchanged form. By evaporation of the aqueous solutions, the condensation products are obtained in the form of thick oils or viscous masses or in the form of solid bodies. Depending on the proportion of the hydrophile and hydrophobe reaction components, they dissolve in water to a clear to turbid solution or they yield with water fine dispersions or emulsions.

There may be introduced, into the condensation products thus obtained, the radicals of polybasic inorganic acids containing oxygen. This introduction is, for instance, performed by treating the condensation products with sulfuric acid, with fuming sulfuric acid, chloro-sulfonic acid, the halides of phosphoric acids or phosphorus pentoxide and transforming the products obtained, by neutralisation, into the corresponding alkali or ammonium salts. This esterification or sulfonation may also occur in the presence of solvents.

There are obtained, in the manner described, products which may be used for various purposes especially in the textile, paper and leather industries. They are, for instance, suitable for being used as wetting, dispersing, emulsifying or cleansing agents, for instance, in washing, fulling, carbonising, mercerising, kier-boiling, dyeing, finishing, and in softening artificial silk; further, in the treatment of hides, leather and the like. The products may be used as such or in admixture with other substances, for instance in combination with soaps, Turkey red oils, sulfonic acids or organic compounds, or with salts, such as perborates and phosphates. In many cases, it is preferable to use them together with organic solvents, such as cyclohexanol, tetrahydronaphthalene, benzyl alcohol, butanol or hydrocarbons, or with glue, gelatine or gum-like substances.

The following examples serve to illustrate the invention, but they are not intended to limit it thereto; the parts are by weight:

1. A mixture of 25 parts of isobutyl-hydroxymethylphenol, 30 parts of sorbitol, 3 parts of sodium amide and 200 parts of butyl-alcohol is heated, to 100° C. for 4 to 5 hours, while stirring. The yellowish solution is neutralised by means of dilute acetic acid, then diluted with water and extracted several times with ether. After evaporation of the aqueous solution, 38 parts of a yellow-brown viscous mass are obtained which dissolves easily in water and has a good frothing and wetting power in mercerising solutions.

Instead of sorbitol, there may likewise be used mannitol, and the sodium amide may be exchanged for sodium alcoholate or sodium hydroxide. There may also be used an acid catalyst, for instance, hydrochloric acid, sulfuric acid, para-toluene-sulfonic acid, zinc chloride or aluminium chloride. The condensation requires in that case, a longer time.

2. 25 parts of isobutyl-hydroxymethyl phenol, 35 parts of glucose and 3 parts of sodium hydroxide, are together heated in 200 parts of aqueous alcohol of 50 per cent. strength for 14 hours, while stirring, to 82° C. The yellow-brown solution is diluted with water, neutralised with dilute acetic acid and extracted several times by means of ether. After evaporation of the aqueous solution, 50 parts of the condensation product are obtained in the form of a viscous yellow-brown mass. It dissolves very easily in water and has a good foaming and wetting power.

There may be used, instead of the aqueous alcohol of 50 per cent. strength, alcohol diluted with water in any desired proportion or water alone.

3. 25 parts of isobutyl-hydroxymethylphenol, 45 parts of cane sugar and 3 parts of sodium hydroxide are together heated, while stirring, for 14 hours, to 83° C., in 250 parts of aqueous alcohol of 50 per cent. strength. The solution is worked up as indicated in the two preceding examples. 66 parts of a soft yellow mass are obtained which dissolves easily in water and is suitable for use as a printing-adjuvant.

Instead of the aqueous alcohol of 50 per cent. strength, water may be used.

4. 36 parts of isooctyl-hydroxymethyl phenol, 45 parts of cane sugar and 3 parts of sodium hydroxide are together heated, while stirring, for 12 hours to 83° C., in 250 parts of aqueous alcohol of 50 per cent. strength. The solution is worked up as described in Examples 1 and 2. 69 parts of a product strongly foaming in water and having a very good wetting, dispersing and cleansing action are thus obtained.

5. 5 parts of isobutyl-hydroxymethyl phenol, 7.5 parts of methyl-glucamine and 0.5 part of sodium hydroxide are together heated while stirring, for 5 hours at 82° C., in 100 parts of aqueous alcohol of 50 per cent. strength. The solution is worked up as described in Examples 1 and 2. 10 parts of a light-brown condensation product which has a very good foaming power and is a good wetting agent are thus obtained.

6. 5 parts of isobutyl-hydroxymethyl phenol, 9 parts of diglucamine and 0.5 part of sodium hydroxide are together heated, while stirring for 4 hours at 82° C. in 100 parts of aqueous alcohol of 50 per cent. strength. The product is worked up as described in Examples 1 and 2. 12 parts of a product which foams strongly in water and may advantageously be used as a wetting agent in mercerising or kier-boiling are thus obtained.

7. 5 parts of chloromethyl-octylphenol, 10 parts of glucose and 1 part of sodium carbonate are together heated, while stirring, for 5 hours at 82° C. in 100 parts of aqueous alcohol of 50 per cent. strength. The product is worked up as described in Examples 1 and 2. 13 parts of a viscous, yellow-brown paste are obtained which dissolves in water, while strongly foaming, and has a wetting, dispersing and cleansing action.

8. 5 parts of chloromethyl-octylphenol, 10 parts of diglucamine and 1 part of sodium carbonate are together heated at 82° C., while stirring for 5 hours, in 100 parts of aqueous alcohol of 50 per cent. strength. The product is worked up as indicated in Examples 1 and 2. 12 parts of a viscous, yellowish paste are obtained, the aqueous solutions of which may be used as indicated in Example 6.

9. 5 parts of chloromethyl-octylphenol, 8 parts of methyl-glucamine and 1 part of sodium carbonate are together heated to 82° C., while stirring, for 5 hours, in 100 parts of aqueous alcohol of 50 per cent. strength. The product is then worked up as indicated in Examples 1 and 2. 10 parts of a paste are obtained the aqueous solutions of which may be used as indicated in Example 6.

10. 5 parts of the chloromethyl compound of an alkylphenol formed by condensation of di-hexylene-diheptylene with phenol, 100 parts of methyl-glucamine, 100 parts of aqueous alcohol of 50 per cent. strength and 1 part of sodium carbonate are together heated at 82° C., while stirring, for 5 hours. The product is worked up as indicated in Examples 1 and 2. 10 parts of a paste are obtained the aqueous solutions of which have a very good cleansing power.

There may also be used, instead of the methyl glucamine, diglucamine.

11. 6 parts of dodecylbenzyl chloride, 9 parts of methyl-glucamine and 100 parts of aqueous alcohol of 50 per cent. strength are together heated at 82° C., for 5 hours while stirring. The product is worked up as indicated in Examples 1 and 2. 11 parts of a light-yellow viscous paste are obtained, the aqueous solutions of which may be used as indicated in Example 10.

12. 6 parts of dodecylbenzyl chloride, 12 parts of diglucamine and 100 parts of aqueous alcohol of 50 per cent. strength are together heated at 82° C. for 5 hours, while stirring. The product is worked up as indicated in Examples 1 and 2. 12 parts of a paste are obtained, the solutions of which have a good foaming and cleansing power.

13. 10 parts of dodecylbenzyl chloride, 8 parts of diethanolamine, 1 part of sodium carbonate and 100 parts of aqueous alcohol of 50 per cent strength are together heated at 82° C., for 6 hours while stirring. The product is worked up as indicated in Examples 1 and 2. 12 parts of a paste are obtained which dissolves in water only to a turbid solution. The condensation product is diluted with 100 parts of ether. 7.5 parts of chlorosulfonic acid are then added drop by drop while stirring and well cooling with ice. After neutralising with dilute sodium bicarbonate solution and distilling the ether, 14 parts of the sulfuric acid ester are obtained in the form of a viscous paste which dissolves easily in water. Its aqueous solution has a very good foaming and cleansing action.

14. 20 parts of octyl-hydroxymethyl-chlorophenol are heated in 150 parts of aqueous alcohol of 50 per cent. strength for 12 hours, while stirring, at 80° C., together with 25 parts of sorbite and 2.5 parts of sodium hydroxide. The reaction solution is worked up as indicated in the preceding examples. 32 parts of a light yellow, soft, water-soluble mass are obtained, the aqueous solution of which possesses a good cleansing action.

15. 50 part of para-cyclohexyl-hydroxymethyl-phenol are heated, while stirring, for 6 hours, at 82° C. in 300 cc. of aqueous alcohol of 50 per cent. strength together with 50 parts of sorbite and 4 parts of sodium hydroxide. After neutralization with dilute acetic acid the whole is diluted with water and several times extracted with ether. After evaporation of the aqueous solution there are obtained 72 parts of a viscous yellow-brown mass which dissolves easily in water and possesses a good foaming and wetting action in mercerising liquors.

16. 35 parts of para-cyclohexyl-chloromethyl-phenol are heated, while stirring, for 6 hours, at 80° C. together with 35 parts of glucose and 12 parts of sodium carbonate in 300 cc. of aqueous alcohol of 50 per cent. strength. The product is worked up as described in the preceding examples. 57 parts of a yellowish brown viscous paste are obtained which may be used as wetting agent in mercerising processes. Instead of glucose also 60 parts of methylglucamine may be used. The condensation product thus obtained is a brownish paste the aqueous solutions of which are well suitable as mercerising liquors.

17. 24 parts of benzyl-octyl-hydroxymethyl-phenol are heated at 80° C. for 10 hours, while stirring, in 130 parts of aqueous alcohol of 50 per cent. strength together with 28 parts of glucose and 2 parts of sodium hydroxide. After neutralization with dilute acetic acid, the reaction solution is diluted with water and extracted once with ether. After evaporation of the aqueous solution 32 parts of a viscous yellow-brown mass are obtained the aqueous solutions of which possess a good foaming action.

18. 30 parts of di-(iso-octyl)-hydroxymethyl-phenol are heated at 80° C. for 12 hours in 150 parts of aqueous alcohol of 50 per cent. strength together with 45 parts of cane sugar and 2.5 parts of sodium hydroxide. The product is worked up as described in Example 17. 42 parts of a light brown coloured condensation product are obtained which shows a good foaming and cleansing action.

We claim:

1. The process which comprises condensing a compound selected from the group consisting of compounds having one of the general formulae

and

and

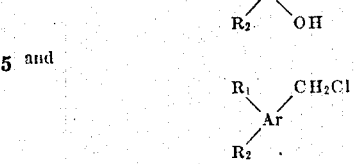

wherein Ar stands for a member of the group consisting of aromatic hydrocarbon radicals and substituted aromatic hydrocarbon radicals, $R_1$ stands for a member of the group consisting alkyl radicals of at least three carbon atoms, aralkyl radicals and cycloaliphatic hydrocarbon radicals, R₂ stands for a member of the group consisting of hydrogen, alkyl radicals of at least three carbon atoms, aralkyl radicals and cycloaliphatic hydrocarbon radicals, with an aliphatic polyhydroxyl compound containing at least three hydroxyl groups.

2. The process which comprises condensing a compound selected from the group consisting of compounds having one of the general formulae

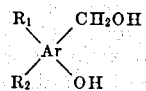

and

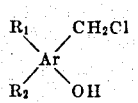

and

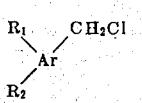

wherein Ar stands for a member of the group consisting of aromatic hydrocarbon radicals and substituted aromatic hydrocarbon radicals, R₁ stands for a member of the group consisting of alkyl radicals of at least three carbon atoms, aralkyl radicals and cycloaliphatic hydrocarbon radicals, R₂ stands for a member of the group consisting of hydrogen, alkyl radicals of at least three carbon atoms, aralkyl radicals and cycloaliphatic hydrocarbon radicals, with an aliphatic polyhydroxyl amine containing at least three hydroxyl groups.

3. The products obtainable by condensing a compound selected from the group consisting of compounds having one of the general farmulae

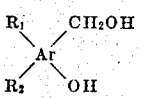

and

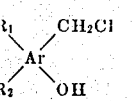

and

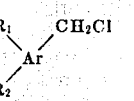

wherein Ar stands for a member of the group consisting of aromatic hydrocarbon radicals and substituted aromatic hydrocarbon radicals, R₁ stands for a member of the group consisting of alkyl radicals of at least three carbon atoms, aralkyl radicals and cycloaliphatic hydrocarbon radicals, R₂ stands for a member of the group consisting of hydrogen, alkyl radicals of at least three carbon atoms, aralkyl radicals and cycloaliphatic hydrocarbon radicals, with an aliphatic polyhydroxyl compound containing at least three hydroxyl groups.

4. The products obtainable by condensing a compound selected from the group consisting of compounds having one of the general formulae

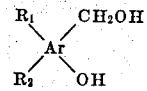

and

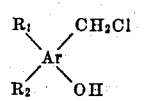

and

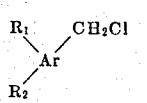

wherein Ar stands for a member of the group consisting of aromatic hydrocarbon radicals and substituted aromatic hydrocarbon radicals, R₁ stands for a member of the group consisting of alkyl radicals of at least three carbon atoms, aralkyl radicals and cycloaliphatic hydrocarbon radicals, R₂ stands for a member of the group consisting of hydrogen, alkyl radicals of at least three carbon atoms, aralkyl radicals and cycloaliphatic hydrocarbon radicals, with an aliphatic polyhydroxyl amine containing at least three hydroxyl groups.

5. The process which comprises reacting the condensation compounds obtainable according to claim 1 containing aliphatic radicals substituted by hydroxyl groups with a sulfonating agent.

6. The process which comprises reacting the condensation compounds obtainable according to claim 2 containing aliphatic radicals substituted by hydroxyl groups with a sulfonating agent.

7. The sulfuric acid esters obtainable by reacting a product according to claim 3 containing aliphatic radicals substituted by hydroxyl groups with a sulfonating agent.

8. The sulfuric acid esters obtainable by reacting a product according to claim 4 containing aliphatic radicals substituted by hydroxyl groups with a sulfonating agent.

LUDWIG ORTHNER.
HEINZ SÖNKE.